No. 701,898. Patented June 10, 1902.
C. H. LARSON.
APPARATUS FOR COLLECTING AND SETTLING DUST.
(Application filed Mar. 20, 1901.)
(No Model.)
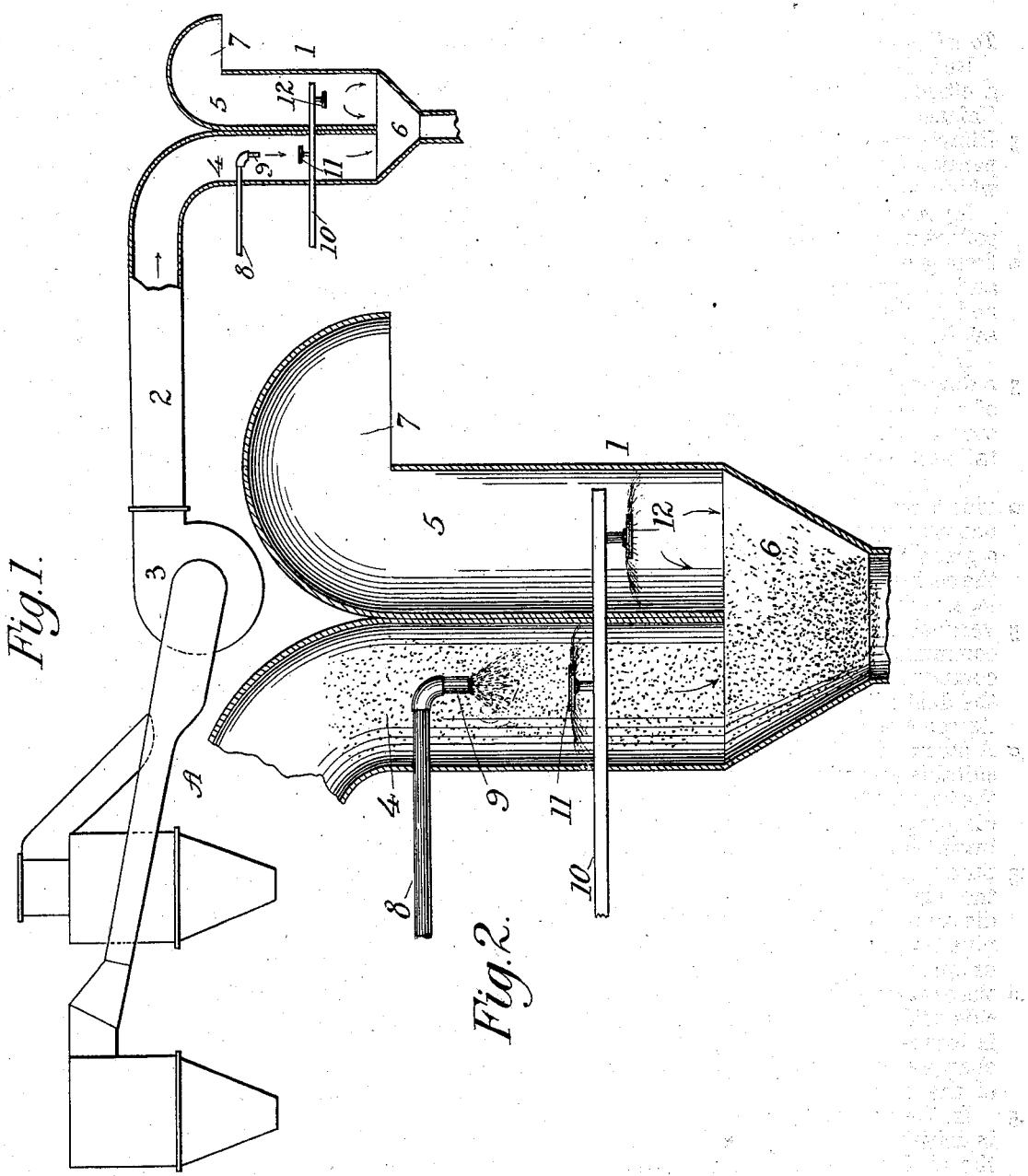
Witnesses
J. S. Bowen
J. W. Garner
Christian H. Larson Inventor
by C. A. Snow & Co.
Attorneys

UNITED STATES PATENT OFFICE.

CHRISTIAN H. LARSON, OF CHICAGO, ILLINOIS.

APPARATUS FOR COLLECTING AND SETTLING DUST.

SPECIFICATION forming part of Letters Patent No. 701,898, dated June 10, 1902.

Application filed March 20, 1901. Serial No. 52,033. (No model.)

*To all whom it may concern:*

Be it known that I, CHRISTIAN H. LARSON, a citizen of the United States, residing at Chicago, in the county of Cook and State of Illinois, have invented a new and useful Apparatus for Collecting and Settling Dust, of which the following is a specification.

My invention is an improved apparatus for collecting and settling the dust which arises from grain scourers, elevators, and the like; and it consists in the peculiar construction and combination of devices hereinafter fully set forth and claimed.

In the accompanying drawings, Figure 1 is a diagrammatic elevation, partly in section, of a dust collecting and settling apparatus embodying my improvements. Fig. 2 is a detail sectional view of the same.

In the embodiment of my invention I provide a trap 1, which is connected to the exhaust apparatus (indicated at A in Fig. 1) of a grain-scourer by a pipe 2, which leads from the casing 3 of the exhaust-fan to the intake-leg 4 of the trap. The said trap comprises the vertical intake and discharge legs 4 5, which communicate at their lower ends, as at 6, the communicating part 6 forming a trap in which the dust may settle. The discharge-leg 5 at its upper end terminates in a discharge-hood 7. A steam-pipe 8 leads from a boiler or other suitable source of steam to the intake-leg 4 of the trap and is provided with a nozzle 9, which discharges a jet of steam downwardly in said intake-leg. A pipe 10 leads from a suitable pump, reservoir, or other source of water to the legs 5 4 of the trap at a point a suitable distance below the steam-pipe 8. Said water-pipe is provided on its upper side with a rose or sprayer 11, which is located in the leg 4 in the center thereof and is provided on its lower side with a similar rose or sprinkler 12, which is located in the leg 5. The said roses discharge sprays of water downwardly in the legs of the trap.

In the operation of my invention the dust is driven downwardly into the intake-leg by the air-blast from the fan. The steam-jet which is discharged downwardly in the intake-leg above the spraying-rose 11 increases the strength of the air-blast at this point, so that the dust carried thereby is driven through and wetted by the spray from the rose 11, and thereby caused to settle, and, moreover, the said steam-jet serves to moisten the finer particles of dust, which might pass the spray without becoming moistened thereby, and causes said finer dust particles to settle in the trap, together with the greater particles and the water. The precipitates may be withdrawn from time to time as the same accumulate. Such particles as may escape precipitation by the spray from the rose 11 in ascending the discharge-leg of the trap are caught and precipitated by the spray from the rose 12 therein. Hence the apparatus is efficient in capturing and settling all of the dust.

Having thus described my invention, I claim—

1. A dust collecting and settling apparatus comprising a descending intake-leg, an ascending discharge-leg, and a port 6 establishing communication between said intake and discharge legs and forming a dust-trap, in combination with pneumatic means to discharge dust into said intake-leg, means to discharge a steam-jet downwardly in the latter, to precipitate the finer dust particles, and means to spray water downwardly in said intake-leg, at a point below said steam-jet, through which water spray the dust particles pass, said discharge-leg permitting the escape of the air after the separation of the dust particles therefrom, substantially as described.

2. A dust collecting and settling apparatus comprising a descending intake-leg, an ascending discharge-leg, and a port 6 establishing communication between said intake and discharge legs and forming a dust-trap, in combination with pneumatic means to discharge dust into said intake-leg, means to discharge a steam-jet downwardly in the latter to precipitate the finer dust particles, and means to spray water downwardly in said intake-leg, at a point below said steam-jet, through which water spray the dust particles pass, said discharge-leg permitting the escape of the air after the separation of the dust particles therefrom, and means to spray water downwardly in said discharge-leg, to arrest such dust particles as may pass the port 6, substantially as described.

In testimony that I claim the foregoing as my own I have hereto affixed my signature in the presence of two witnesses.

CHRISTIAN H. LARSON.

Witnesses:
CHARLES ARVESEN,
LOUIS C. MACKEL.